United States Patent [19]
Camardella

[11] 3,938,748
[45] Feb. 17, 1976

[54] MACHINE TOOL WITH INTERMITTENTLY ROTATABLE TURRET, MORE PARTICULARLY A COIL WINDER, AND METHOD OF OPERATING SAME

[76] Inventor: Giuseppe Camardella, No. 1, Via E. Biondi, 20154 Milan, Italy

[22] Filed: Mar. 13, 1974

[21] Appl. No.: 450,916

Related U.S. Application Data

[63] Continuation of Ser. No. 15,808, March 2, 1970, abandoned.

[52] U.S. Cl. ............. 242/7.09; 29/38 A; 140/92.1; 242/7.11; 242/7.14
[51] Int. Cl.² ........................................ H01F 11/04
[58] Field of Search ....... 242/7.02, 7.09, 7.11, 7.14; 29/38 A, 605; 140/92.1

[56] References Cited
UNITED STATES PATENTS

| | | | |
|---|---|---|---|
| 3,106,351 | 10/1963 | Fulton | 242/7.14 |
| 3,150,439 | 9/1964 | Van Deberg | 29/38 A |
| 3,216,461 | 11/1965 | Camardella | 29/38 A |
| 3,643,881 | 2/1972 | Beumer et al. | 29/38 A |
| 3,649,415 | 3/1972 | Eminger | 242/7.09 X |

*Primary Examiner*—Edward J. McCarthy
*Attorney, Agent, or Firm*—Benjamin J. Barish

[57] ABSTRACT

An improved method and machine are described for performing a plurality of working operations, such as for producing finished, wound coils, the working operations including a basic working operation requiring a relatively long time, e.g. winding the coil, and a plurality of complementary working operations each requiring a relatively short time, e.g. finishing the wound coil, the improvement being in carrying out the basic working operation on n parts simultaneously at *n* working stations, *n* being at least two, and carrying out the complementary working operations in succession on single work pieces, the work pieces being advanced at the end of each basic operation by *n* steps of which the last step is followed by a long stop, for carrying out the next basic working operation and a complementary working operation, and the other steps are followed by short stops for carrying out only complementary working operations.

4 Claims, 2 Drawing Figures

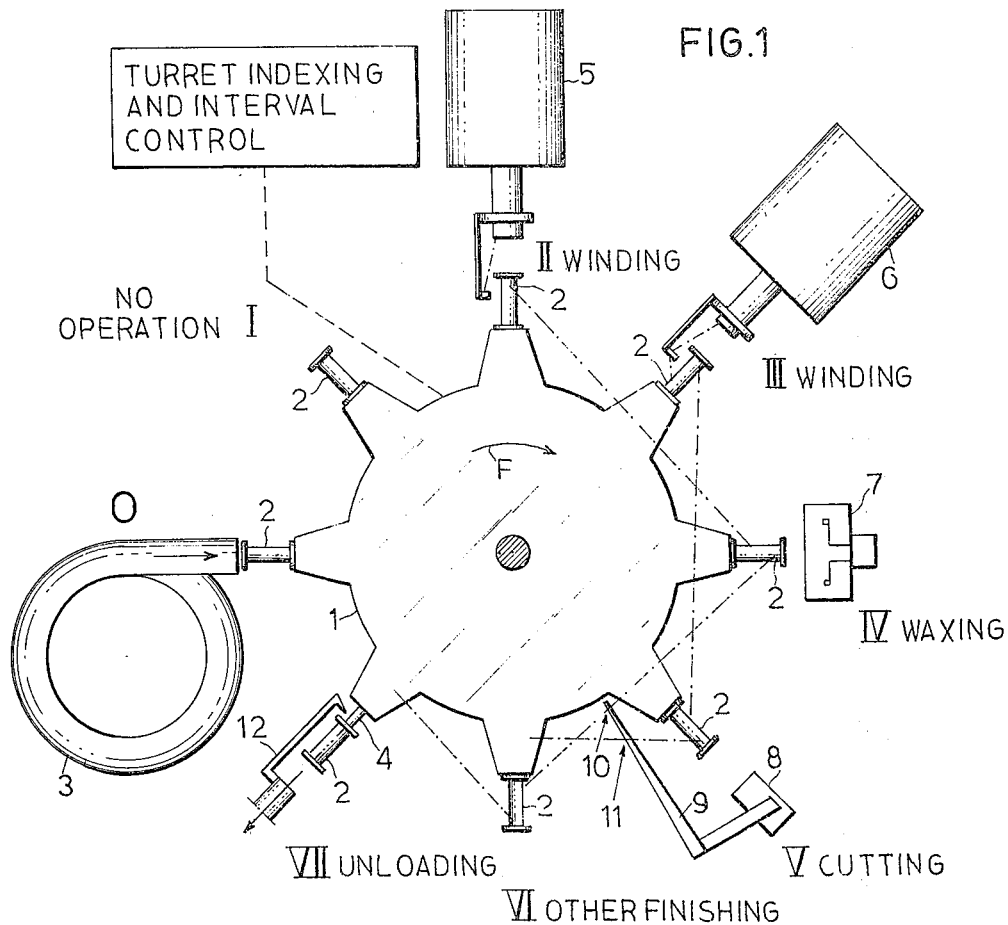

MACHINE TOOL WITH INTERMITTENTLY ROTATABLE TURRET, MORE PARTICULARLY A COIL WINDER, AND METHOD OF OPERATING SAME

This is a continuation of application Ser. No. 15808 filed Mar. 2, 1970, abandoned.

BACKGROUND OF THE INVENTION

1. Field of the Invention

The present invention relates to machine tools of the type having an intermittently revolving turret conveying a part or workpiece to be processed through a series of working stations in at least one of which there is provided a working cycle essentially longer than in the others.

Although the invention relates to machine tools of this type in a completely general way, reference is made hereinafter, for greater simplicity and clarity, to a coil winding machine, in which the application of the principles of the present invention proves to be particularly advantageous.

2. Brief Description of the Prior Art

In the field of coil winders or winding machines designed essentially to form windings for relays, or in any case windings with a medium-high number of turns, the idea of forming a plurality of windings at the same time so as to increase the productivity of the machine and reduce costs, is already known. For the practical carrying into effect of this idea, various types of machine have been proposed. These can be grouped essentially into three classes:

a. machines with a single rotating spindle on which a plurality of coil supports are placed and with a substantially fixed wire guide. This type of machine, although it is very common, does not permit high outputs, nor does it allow automatic loading of the supports; moreover, it is generally employed for the windings only inasmuch as it does not lend itself to combination with apparatus for finishing the coils.

b. machines equipped with a revolving table by means of which a plurality of winding heads each provided with a winding spindle carrying a corresponding coil support are moved; the rotating table is adapted to bring each of the winding heads into correspondence with at least one fixed station for loading, unloading and/or finishing. In effect, these machines have a very high output, but they are also substantially more costly and generally require the constant attendance of an operator.

c. machines which make use of an intermittently rotating turret, on which the coil supports are fixedly mounted, and of at least one fixed winding head with a rotary wire guide and with respect to which the indexing turret moves. This arrangement has the considerable advantage of allowing easy installation of complementary operative stations, such as, above all, a station for automatically loading the coil supports and, moreover, waxing, cutting, terminal bending and/or tinning and other stations, which will be referred to briefly hereinafter as finishing stations.

The present invention relates precisely to machines of the type indicated in paragraph c) and its object is principally to increase the productivity of these machines, essentially by reducing the waiting times, by extremely simple and effective means.

In effect, in machines of this type with an intermittently rotating turret, there is generally a considerable difference between the time necessary for winding a coil and the time necessary for executing the other operations of finishing; it happens, therefore, that at each cycle, all the finishing stations - their respective functions having been completed - remain inoperative throughout the additional time in which the winding operation is brought to an end. This fact therefore entails waiting or dead times at all the finishing stations and these have a negative effect on the productivity of the machine.

Various improvements have already been proposed for obviating this drawback:

A. According to one known improvement, use is made of a pair of winding heads disposed in diametrically opposite positions in relation to the rotating turret and after each of which respective finishing stations are provided. From the point of view of concept, this machine corresponds to a pair of single machines, so that with respect to the latter the advantages of high output, with lower total cost of the machine, is obtained; however, with this arrangement, the dead times at the finishing stations are exactly the same.

B. According to another improvement, the winding head is rendered capable of winding a series of coils, for example up to four coils, at the same time, and these are then generally treated simultaneously in the successive finishing stations. This is achieved principally by replacing the normal wire guide by a series of e.g. four, parallel wire guides which wind four coils simultaneously on four parallel fixed pins, for example as proposed in Italien Pat. No. 792,849 filed 27th Jan. 1967 by the same Applicant. This machine also does not eliminate the dead times in themselves, but it enables the loss due to the same to be distributed over a greater number of finished coils.

C. Following this last principle, it has also been proposed to dispose two or more coils coaxially on each fixed pin. This arrangement, however, has limits deriving: a) from the complication which would arise from the use of an automatic loading device, which would have to be adapted to pass two or more coil supports onto each spindle or pin at the same time; b) from the ratio between length and diameter of the pins, which, if they are not to be confined to the making only of very short coils, would generally have to be too high to permit the production of a sufficiently rigid and strong support; c) from the excessive extension which each wire guide would come to have, with the consequent risks of accentuated flexing and bending until the breaking point.

SUMMARY OF THE PRESENT INVENTION

The present invention, on the other hand, relates to a method which enables the dead times to be really reduced, thus increasing the productivity of the machine.

According to the present invention, in a machine tool, or in a machine or apparatus in general, in which a feed support, onto which the parts or workpieces to be processed are loaded, is caused to advance by steps to convey said parts or workpieces through a series of working stations at which the parts or workpieces are successively subjected to a basic working operation requiring a relatively long time and to a plurality of complementary working operations each requiring a relatively short time, there is provided a method of control which is characterized in that the basic working operation is carried out on $n$ parts simultaneously through the medium of a plurality of tools working in parallel at $n$ working stations, $n$ being at least 2, while each complementary working operation is carried out successively on single workpieces at single working stations, the feed support being advanced at the end of each basic working operation by $n$ steps of which the last step is followed by a long stop for carrying out a complementary working operation and the next basic working operation, and the other steps are followed by short stops for carrying out only complementary working operations.

More particularly, when the invention is applied to a coil winder having an intermittently rotating turret and including a single finishing station for each finishing operation, at least two winding heads operating in parallel at separate adjacent stations, are provided, and the rotating turret is caused to advance at the end of each winding operation by a number of steps corresponding to the number of winding heads, the turret making at the end of at least the first step an essentially short stop corresponding to the operative time of the finishing stations only, while at the end of the last step it makes an essentially long stop corresponding to the winding time.

As can easily be understood, with the use of two winding heads, the rotating turret performs two steps at the end of each winding operation, but only at the end of the second step is a long stopping time (corresponding to the winding time) provided, while at the end of the first step of a very brief stopping time is provided during which only the finishing stations are operative. During the first step, therefore, the dead times at the finishing stations are completely eliminated, only the dead time of this very brief stop being left at the two winding stations. At the end of the second step, on the other hand, the dead times at the finishing stations remain in known manner.

Of course, instead of using two winding heads, it is possible to make use of a greater number, which may be chosen appropriately in the design stage. With three winding heads, for example, the rotating turret will perform, at the end of the winding operation, a first and a second step, with short stopping times during which the finishing stations only are operative, and, finally, a third step, with a longer stopping time during which the winding heads also become operative again.

According to another aspect of the invention, the machine includes a turret having a number $x$ of radial supports carrying a number $x$ of parts, said turret being rotatable with a stepwise movement with respect to $x$ working stations, and a series of interchangeable tools fixedly mounted at each station, said interchangeable tools including main tools for performing basic working operations, and secondary tools for performing complementary working operations, the number of secondary tools being $y$, the number of main tools being $n$ and being equal to $x - y$.

BRIEF DESCRIPTION OF THE DRAWING

The invention is better described with reference to a preferred constructional form, which is given purely by way of a non-limitative example, with reference to the accompanying drawings, in which:

FIG. 1 is a plan view of a machine layout according to the invention; and

FIG. 2 is a chart illustrating the operation of the machine of FIG. 1.

DESCRIPTION OF THE PREFERRED EMBODIMENT

As shown, the machine includes an intermittently rotating turret 1, rotatable in the direction indicated by the arrow F with a stepwise movement so as to transfer the coils 2 at each step to the station immediately following. Many arrangements are known and in commercial use for indexing the turret and for controlling the intervals beween the indexing steps, and therefore such a unit is illustrated merely in block form, identified as TI, in the drawing. For example, U.S. Pat. No. 3,150,439 describes one such specific indexing mechanism. Well known timers may also be used for controlling the drive motor for advancing the indexing turret.

In position O, a device 3 provides for automatically loading the coil supports onto the holding pins or spindles 4, which project from the indexing turret in correspondence with each station.

In position I, the machine shown does not effect any operation. In positions II and III, winding heads 5 and 6 are provided, and these operate in parallel to produce two windings which are preferably identical; if necessary, it is also possible to produce different windings, but only in the case where identical finishing operations are to be carried out on the same.

In position IV there is provided a station for fixing the turns, for example a waxing station 7.

In position V, a cutting station 8 is provided. In the arrangement illustrated, the shears 9 are shaped centrally in arcuate form, so as to cut the wire connecting two coils only in the position 10; alternatively, shortened shears which cut the wire only in the position 11 may be provided.

In position VI, the machine illustrated does not provide for any operation; other finishing devices could be provided at this station, however, for instance terminal bending and/or tinning devices.

In position VII, an unloading device 12 for the finished coils is provided, the unloading being effected either by mechanical means (as shown) or by pneumatic or other means.

FIG. 2 illustrates the operation of the machine of FIG. 1 in accordance with the invention.

Stations II – VII refer to the corresponding stations in FIG. 1, of which Stations II and III are each for a winding operation which may be referred to as a basic or long - time operation having a duration of 10 seconds for example; while Stations III – VII are various finishing operations, which may be referred to as complementary or short-time operations having a time duration of 1 second for example. The letters $9 - f$ indicate the successive steps of indexing the turret 1.

Thus, when the turret has been indexed to Step a, coil 1 is moved into Station II (winding), and remains there for a short time (1 second). The turret is then advanced to Step b, whereupon coil 1 is moved to Station III (winding), and coil 2 is moved to Station II (winding). The two coils remain in their stations for a long time period (10 seconds, and both winders are operated to wind the respective coils in parallel.

The turret is then indexed to step c moving coil 1 to Station IV, (waxing), and coil 2 to Station III (winding). Neither winder of Stations II or III is operated, but the waxing device in Station IV is operated to perform this finishing operation on the wound coil 1. The turret remains in Step c for a short time (1 second) during which this finishing operation is performed.

The turret is then indexed to Step d, whereupon coil 1 is advanced to Station V (cutting), coil 2 is advanced to Station IV (waxing), coil 3 is advanced to station III winding, and coil 4 is introduced into Station II (winding). The turret remains at this step for a long time period (10 seconds) during which both winders 5 and 6 (Stations II and III) are operated to wind coils 3 and 4 and also the complementary operations of Station IV (waxing) and Station V (cutting) are performed on coils 2 and 1, respectively.

The turret is then advanced to Step e, whereupon coils 1-4 are advanced one station, and coil 5 is introduced into the winding Station II. This time step is for a short (1 second) duration, and neither of the winding devices in Stations II and III is operated.

Finally, the turret is indexed to Step f, wherein coils 1-5 are advanced one station, and coil 6 is introduced into winding Station II. The turret remains in this step for a long time interval, 10 seconds, during which interval the winding operations are performed on both coils 5 and 6 in parallel, and the complementary or finishing operations are performed on coils 1 - 4.

It is easy to realize that, with the arrangement according to the invention, the dead times at the finishing stations are halved, owing to the fact that working is carried out alternately in a stopping time of the turret corresponding to the working time and in a stopping time comprising a wait corresponding to the winding time. Of course, the total gain does not correspond exactly to one half of the dead times of known machines, since it is necessary to take account of the dead times at the two winding stations during the short stop; these last-mentioned dead times, however, have relatively little effect.

The above example of FIG. 2 considered a coil winder in which the winding time of each coil is 10 seconds, while the working time at the finishing stations is only 1 second. According to a known arrangement, a coil is produced and unloaded every 10 seconds and, therefore, two coils are produced and unloaded every 20 seconds, (with a working time for each coil which, including the dead times at four finishing stations, is 50 seconds). With the arrangement according to the invention, under the same conditions, the production and unloading of two coils every 11 seconds is obtained, (with a working time of 33 seconds for each coil). When the machine is in production, anyhow, the gain in time is in the ratio of 11 to 20.

According to the present invention, it is also possible, on the other hand, to make use of a greater number of winding heads. Still referring to the drawing, it is therefore possible to install a winding head also in Station I; in this case, there would be $n = 3$ basic operations, and the movement of the turret is then controlled so as to make $n - 1$ or two short stops and one long stop every three steps. Three coils can thus be unloaded every 12 seconds, with a gain of 12 to 30 seconds.

It is obvious from the foregoing that not only can the invention not be considered to be confined to the use of two or three winding heads which operate in parallel, but, rather, the invention itself suggests that use be always made of the maximum possible number of heads. Thus, for example, bearing in mind that present coil winders of this type allow the devices operating at the individual stations to be mounted, removed and replaced or interchanged readily, it is possible to adapt a given machine having a fixed number of stations from time to time to the working requirements for a given coil by always choosing the conditions of maximum productivity. In limit conditions, for a coil which would only have to be wound, it would be possible to provide only one loading station for the coil support and one unloading station, while the other stations could be provided with winding heads. In the case of the arrangement illustrated, if the stations O and VII are occupied by the loading and unloading devices, the other six stations from I to VI could be provided with winding heads; in this case, there would be $n = 6$ basic operations, and the turret would have to be controlled so as to make $n-1$ or five short stops and one long stop every six steps and unload six coils every 15 seconds, with a gain in time of 15 to 60. Thus, this invention can be used generally in a machine in which the turret has a number of $x$ radial supports carrying a number of $x$ parts, and is rotated with a stepwise movement with respect to $x$ working stations, and in which the machine includes a series of interchangeable tools fixedly mounted at each station, the interchangeable tools including main tools for performing basic working operations (e.g. winding), and secondary tools for performing complementary working operations (e.g. waxing, cutting, etc.), the number of secondary tools being $y$, the number of main tools being $n$ and being equal to $x - y$, the method being further characterized by causing the turret to advance at the end of each basic working operation for a first series of $n-1$ steps each followed by an essentially short stop, and for a further step followed by an essentially long stop.

It is understood, in any case, that the invention is open to many adaptations and variations all coming within the scope of the same. The invention is not meant to propose an alternative to the solutions proposed in points A), B) and C) mentioned above, but rather an arrangement which can be employed in conjunction with these solutions. In fact, following for example proposals B) and C), the apparatus illustrated could include, in positions II and III, winding heads each having four parallel wire guides operating in correspondence with four parallel pins or spindles 4, or a plurality of wire guides operating on shorter coils mounted on the same spindle 4, or a combination of these systems.

In the same way, it must be considered that the invention is not confined to the field of coil winding machines, but finds application to all machine tools or in general in all those machines in which, as has been said, a working cycle on a part or workpiece comprises a basic working operation, performed by a tool in a long time, and a plurality of complementary working operations, performed by other tools in short times, at a sequence of stations to which the part is caused to advance.

What is claimed is:

1. A method of performing a plurality of working operations on successive workpieces, the method including loading on a feed support the workpieces to be processed, and advancing the feed support by steps to convey the workpieces through a series of working stations, said working operations including a basic working operation requiring a relatively long time, and a plurality of complementary working operations each requiring a relatively short time, characterized in carrying out said basic working operation on $n$ parts simultaneously at $n$ working stations, $n$ being at least 2, carrying out said complementary working operations in succession on single workpieces at single working stations, and advancing said feed support at the end of each basic working operation by $n$ steps of which the last step is followed by a long stop for carrying out the next basic working operation and a complementary working operation, and the other steps are followed by short stops for carrying out only complementary working operations.

2. A method as defined in claim 1 wherein the basic working operation is the winding of a coil support, and the complementary working operations are finishing operations for the wound coils.

3. A method of operating a machine for performing a plurality of working operations in accordance with the method of claim 1 on a set of workpieces, the working operations including a basic and complementary working operations each requiring a relatively short time, the machine comprising, a feed support, means for advancing same along a closed path to convey workpieces through a plurality of working stations arranged in fixed positions, said plurality of working stations including a single working station for each different complementary working operation and a plurality $n$ of adjacent working stations for performing the basic working operation on $n$ workpieces simultaneously, said method being characterized by advancing the feed support at the end of the basic working operation through $n-1$ steps providing after the latter step a dwell of relatively short length but just sufficient to enable the complementary operations to be performed at their respective working stations while the basic working operation is not performed, thereafter advancing the feed support through a further step which is followed by a relatively long dwell, and in said long dwell performing the basic working operations on a new set of $n$ workpieces, while also performing the complementary working operations.

4. A method as defined in claim 3, wherein said machine is a coil winder, and said feed support includes a turret rotatable with a stepwise movement to transfer each coil to a series of successive working stations, said method being further characterized by operating simultaneously at least two coil winding heads and causing said turret to advance at the end of each basic working operation for at least a first step followed by a short stop, and a second step followed by a long stop.

* * * * *

UNITED STATES PATENT OFFICE
CERTIFICATE OF CORRECTION

Patent No. 3,938,748            Dated February 17, 1976

Inventor(s) Giuseppe Camardella

It is certified that error appears in the above-identified patent and that said Letters Patent are hereby corrected as shown below:

The following should be added to the heading of the Patent:

Foreign Application Priority Data

March 3, 1969     Italy  ---- 13595 A/69

Signed and Sealed this

Seventh Day of June 1977

[SEAL]

Attest:

RUTH C. MASON
*Attesting Officer*

C. MARSHALL DANN
*Commissioner of Patents and Trademarks*